United States Patent [19]
Kayser
[11] 4,019,783
[45] Apr. 26, 1977

[54] PROCESS AND APPARATUS FOR CONTINUOUSLY CONVEYING PARTICULATE MATERIAL

[76] Inventor: Lutz Tilo Kayser, Am Bismarckturm 10, Stuttgart, Germany

[22] Filed: July 28, 1975

[21] Appl. No.: 599,546

[30] Foreign Application Priority Data

Aug. 6, 1974 Germany .......................... 2437856

[52] U.S. Cl. .................................. 302/25; 302/35; 302/52; 302/57

[51] Int. Cl.² .................. B65G 53/14; B65G 53/42

[58] Field of Search .................. 302/25, 35, 40, 45, 302/51, 52, 57, 66

[56] References Cited

UNITED STATES PATENTS

| | | | |
|---|---|---|---|
| 1,020,743 | 3/1912 | Burlingham et al. | 302/25 |
| 1,152,302 | 8/1915 | Davenport | 302/25 |
| 1,486,883 | 3/1924 | Halliburton | 302/57 |
| 1,751,624 | 3/1930 | Du Brul | 302/25 |
| 1,908,220 | 5/1933 | Chapman | 302/52 |
| 1,970,405 | 8/1934 | Thomas | 302/52 |
| 2,310,265 | 2/1943 | Sweeny | 302/25 |
| 3,365,242 | 1/1968 | Marchetti | 302/35 |
| 3,504,945 | 4/1970 | Leibundgut et al. | 302/51 |
| 3,512,841 | 5/1970 | Kollasch et al. | 302/51 |

FOREIGN PATENTS OR APPLICATIONS

| | | | |
|---|---|---|---|
| 320,391 | 10/1929 | United Kingdom | 302/25 |

*Primary Examiner*—Evon C. Blunk
*Assistant Examiner*—Jeffrey V. Nase
*Attorney, Agent, or Firm*—Michael J. Striker

[57] ABSTRACT

A process and an apparatus for continuously conveying particulate material includes pressurizing a carrier fluid and admitting it at a predetermined flow rate and pressure to a path. A de Laval nozzle having a diffusing cone section accelerates the pressurized carrier fluid in a downstream portion of the path to a relatively higher flow rate and also expands the carrier fluid to a relatively lower pressure. A mixing chamber receives the reduced-pressure accelerated carrier fluid, and a feeder device supplies particulate material to the mixing chamber so that the high speed of the carrier fluid will entrain the particulate material in a region where the low pressure of the carrier fluid will cause the particulate material to be free of any agglomerations or lumps.

20 Claims, 2 Drawing Figures

PROCESS AND APPARATUS FOR CONTINUOUSLY CONVEYING PARTICULATE MATERIAL

BACKGROUND OF THE INVENTION

The present invention relates to a process and an apparatus for continuously conveying particulate material under pressure, and more particularly for conveying coal dust to a combustion or gasification chamber.

In the prior art, it is known to pressurize particulate material, such as coal dust, by using pressure compartments, commonly known as pressure locks. Such pressure compartments subject the coal dust to pressure above atmospheric pressure and thereby cause portions of the coal dust to agglomerate, that is to form lumps.

It is further known to mix the coal dust with fluids, such as water or oil, and pump the resulting mixture to a combustion chamber using pressure sludge pumps. This approach also compacts the particulate material into lumps, thus making the continuous conveying of the particulate material both difficult and unreliable.

Furthermore, the water or oil component of the pumped mixture causes other difficulties, because the coal dust is not sufficiently wettable, as well as being an undesired additive, especially in applications where the particulate material is to be employed in a combustion or gasification chamber.

SUMMARY OF THE INVENTION

Accordingly, it is a general object of the present invention to overcome the disadvantages of the prior art.

More particularly, it is an object of the present invention to provide an improved process for continuously conveying particulate material in a path.

Another object of the invention is to provide an apparatus for continuously conveying particulate material which is simple in its construction when compared to the conventional prior art arrangements.

A further object is to convey particulate material without requiring the use of pressure compartments.

An additional object is to convey particulate material without it being necessary to add water or any other liquid to the particulate material.

Still another object of the invention is to provide a method and an apparatus which conveys the particulate material in a continuous and even manner without the formation of any agglomerations or lumps which would otherwise clog the apparatus and-prevent a smooth and continuous operation.

In keeping with these objects and others which will become apparent hereafter, one feature of the invention is to provide means for pressurizing a carrier fluid and admitting it at a predetermined flow rate and pressure to a path. Nozzle means are utilized for accelerating the carrier fluid in a downstream portion of the path to a flow rate higher than the predetermined flow rate and for expanding the carrier fluid to a pressure lower than the predetermined pressure of the carrier fluid. A mixing chamber is provided which is in communication with both the reduced-pressure accelerated carrier fluid and a source of particulate material, while, at the same time, the low pressure of the carrier fluid will cause the particulate material to be free of any agglomerations or lumps.

The invention thus overcome the prior art drawbacks of using pressure locks and adding liquid to the particulate material in a simple and reliable manner. The particulate material is never subjected to pressures greatly in excess of atmospheric pressure so that compaction of the particulate material is prevented.

Depending upon the application, steam vapor, air and/or oxygen can be pressurized, for example, in a range from 20–100 atmospheres, and can be admitted into the path and expanded by the nozzle to supersonic speeds and pressures on the order of 0.7 atmospheres absolute. Air or oxygen may be added upstream or downstream of the portion of the path at which the expansion of the carrier fluid occurs. For example, if any particulate material is to be combusted, the steam vapor would be eliminated from the carrier fluid and only air and/or oxygen would be utilized to entrain the particulate material.

Another feature of the invention is to feed the particulate material into the mixing chamber at a controlled rate. A metering device including a slidable control member is positioned adjacent an outlet of a container storing the particulate material.

The outlet of the container may be positioned vertically above the mixing chamber which has a feeding slot which may extend, at least in part, about the circumference of the mixing chamber.

This positioning of the container outlet results in the particulate material being radially fed into the carrier fluid. An alternative positioning of the container outlet will result in other feeding arrangements. For example, the container outlet may be positioned axially upstream and centrally with respect to the longitudinal axis of the mixing chamber. The positioning of the container outlet feeds the particulate material centrally and axially into the carrier fluid.

Another feature of the invention is to provide a constricting passage downstream of the mixing chamber for reducing the speed and increasing the pressure of the mixture of particulate material and carrier fluid so that it can be delivered to the place of consumption with the required pressure and velocity characteristics.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
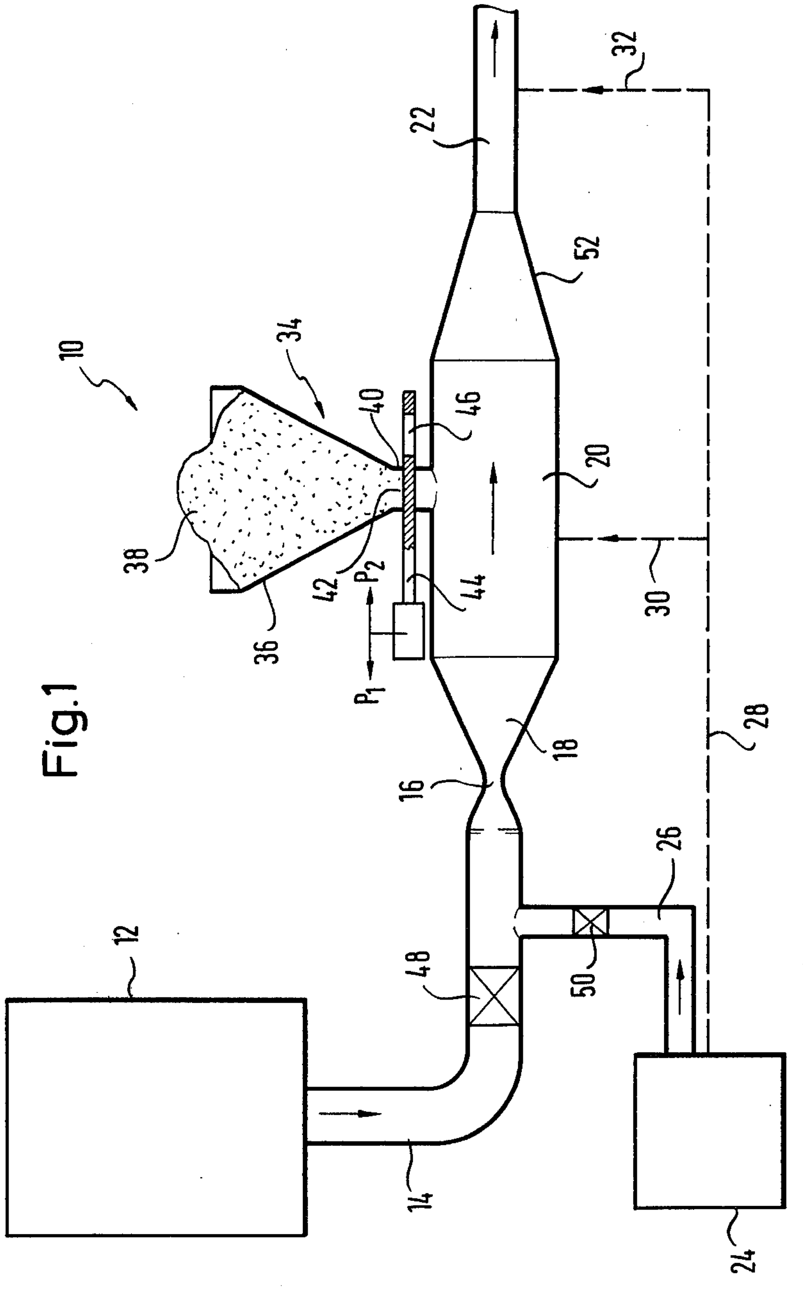
FIG. 1 is a diagrammatic, partially sectioned, view of a first embodiment of an apparatus according to the present invention.

Discussing the apparatus and the process jointly and referring initially to the embodiment illustrated in FIG. 1, reference numeral 10 generally identifies the entire apparatus for continuously conveying particulate material in a path. At an upstream portion of the path, a pressurized source of a carrier gaseous fluid medium is provided. Either the steam generator 12 or the pressure tank 24, or both, may admit a carrier fluid at a predetermined flow rate and pressure to the upstream portion of the path.

In the case of the steam generator 12, the steam produced is heated, pressurized and processed by conventional means to a high desired pressure, e.g. 100 atmospheres, so that, depending upon the desired application, the pressurized steam will have a predetermined pressure, temperature and velocity characteristic. The pressurized steam is admitted to the pipe 14 and conveyed to the nozzle 16 which has a velocity-accelerating portion or diffusor cone section 18.

In the case of the pressure tank 24, the carrier fluid gaseous medium, e.g. air or oxygen, is pressurized, that is compressed, and processed by conventional pump means to a predetermined pressure, temperature and velocity characteristic. The compressed carrier fluid is sequentially admitted to the pipe 26 and then to the pipe 14 at a portion of the path upstream of the nozzle 16, and therefore conveyed to the nozzle 16 itself.

As noted above, depending upon the application, either the pressurized steam and/or the compressed air or oxygen are utilized. When it is not necessary to employ the steam or when only a controlled amount of steam is needed, control valve 48 located in pipe 14 upstream of the pipe 26 may be completely or partially closed. In a similar manner, the control valve 50 located in pipe 26 may be completely or partially closed to control the quantity of compressed air or oxygen being admitted to the nozzle. Finally, the control valves 48 and 50 may be so opened so that a regulated mixture of pressurized steam and compressed gas may be conveyed to the nozzle 16. In any of the aforementioned compositions of the carrier fluid medium, it must be remembered that the carrier fluid delivered to the inlet of the nozzle 16 must have a high pressure characteristic, for example 100 atmospheres.

Downstream of the nozzle 16 and its velocity accelerating portion 18, the carrier fluid flows into a mixing chamber 20. The chamber 20 is elongate and has a tubular-shape that has a substantially constant cross-section.

A feeding device 34 supplies particulate material to the mixing chamber 20, and the mixture of particulate material and the carrier fluid is conducted through a constricting passage 52 and, in turn, to a cylindrical delivery pipe 22. The delivery pipe 22 has a constant diameter whose size is less than the diameter of the tubular-shaped mixing chamber 20 but greater than the diameter of the narrowest cross-section of the nozzle 16. The delivery pipe 22 (which is shown broken) supplies the mixture to the place of consumption where it will be used (non-illustrated).

In some applications, it is not necessary to supply the compressed air or oxygen upstream of the nozzle 16. For example, if the apparatus is used to convey combustible particulate material in a path to a combustion or gasification chamber, the air or oxygen which is needed to support combustion may be admitted to any portion of the path upstream of the combustion chamber. Thus, FIG. 1 shows diagrammatically, using broken lines, two other arrangements for supplying the carrier air or oxygen, each of which can be individually employed alone, or in combination with the above-mentioned supplying arrangement 26. Thus, a pipes 28 and 30 can be employed to deliver the carrier gas to the mixing chamber 20, or pipes 28 and 32 can be employed to deliver the carrier gas to the delivery pipe 22, instead of delivering the carrier gas by means of the pipes 26 and 14.

As will be described in detail below, depending upon the supplying pipe arrangement selected, the carrier gas must be pressurized by the tank 24 to different magnitudes. If the carrier gas is admitted by means of pipe 26, then the gas must be pressurized to the same pressure as exists in the pipe 14, that is, for example, 100 atmospheres. On the other hand, if the gas is fed by means of pipe 30, then the gas need be pressurized only to ordinary ambient pressure due to the action of the nozzle 16. Finally, if the gas is fed by means of pipe 32, then the gas must be pressurized to the pressure existing in the delivery pipe 22 which has been increased relative to the pressure in the mixing chamber 20 due to the action of the constricting passage 52. Valves similar to the control valves 48 and 50, which adjust the ratio of pressurized steam to compressed gas in the pipes 14 and 26, are provided in the pipes 30 and 32, although not shown in the drawing.

The feeding device 34 which supplies particulate material 38 is shown mounted above the mixing chamber 20. The particulate material 38 comprises any finely divided, or granular, or powdery solid material. In one preferred embodiment, finely-divided coal dust is used.

The particulate material 38 is supplied to the funnel-shaped hopper or container 36 having an open side at its top-most portion to receive the material 38 from above. At its lowermost portion, the container 36 has a tubular portion defining a metering chamber 40. The particulate material is conducted downwardly, for example under the influence of gravity, into the metering chamber 40 and enters the mixing chamber 20 by means of the outlet 42.

Extending across the funnel outlet 42 is a metering means comprising a control member 44 which is slidable in the direction indicated by the arrows $P_1$ and $P_2$. The control member 44 has at least one opening 46 which is movable into registry with the outlet 42 so as to allow the particulate material 38 to descend freely into the chamber 20. The control member 44 may be moved so that it completely opens, completely closes, or partially opens the outlet 42 so that the amount of the particulate material 38 can be metered as desired. To achieve this aim, the opening 46 may be formed with any configuration, such as an annular, polyhedral, square, rectilinear, or oblong shape or otherwise. These shapes are exemplary only and are not intended to exclude other similar configurations such as a continuous or interrupted slot.

The metering means illustrated in FIG. 1 are only diagrammatically shown and can be arranged in other functionally equivalent manner. Such considerations depend upon the nature of the particulate material, the feeding rate desired, the size of the individual particles, the dryness of the particulate material, etc.

The feeding device illustrated in FIG. 1 is vertically oriented and feeds the particulate material 38 perpendicularly into the horizontal-extending path of the carrier fluid, that is normally to the axis of the elongated mixing chamber 20. It will be understood that the particulate material 38 can be fed into the chamber at other angles of entry, for example, it can be axially fed in the direction of the flow of the carrier medium or at any other intermediate entry angle.

Moreover, the mixing chamber can be formed with an annular slot, either completely or partially surrounding its circumference. In this construction, the particulate material 38 will be radially fed inwardly through the slot to achieve a more uniform mixture.

The nozzle 16 is a converging-diverging tube, commonly known as a de Laval nozzle. Such a nozzle is used for obtaining high gas velocities and has an orifice followed by a diffusing cone section. A de Laval nozzle essentially changes the pressure and velocity characteristics of the carrier fluid which flows through its throat. The carrier fluid, which is initially compressed at the upstream end of the nozzle, has a high pressure and low velocity characteristic. Within the diffusing cone or diverging portion 18 of the nozzle, the carrier gaseous medium is expanded and the velocity of the latter is greatly increased. The expansion of the gaseous medium, which causes its velocity to increase, is accompanied by a lowering of the pressure of the carrier fluid.

The dimensions for the size of the narrowest cross-section of the nozzle 16 is calculated by known gas dynamic formulas depending upon such input parameters as the pressure, temperature, composition of and the desired mass flow rate of the carrier gaseous medium. The area ratio and the distance between the narrowest cross-section of the nozzle 16 and its widest cross-section, which is located at the downstream end of the diffuser section, is calculated by known fluid flow relationships so that the static pressure within the mixing chamber 20 is slightly below the ambient pressure which is usually atmospheric pressure. For the design and theory of flow in de Laval cones, see Stodola, "Steam Turbines," Loewenstein tra., Mc Graw-Hill, New York, 1927.

In one preferred case, the pressure in the mixing chamber 20 is chosen to be 0.7 atmospheres absolute which is 0.3 atmospheres below the ambient pressure. The cross-section configuration of the nozzle and its diffusing cone section may be circular — or rectangular — shaped, as viewed in sections taken normal to the direction of the flow of the carrier fluid. In the diffusing section 18, the cross-sections increase in area in the downstream direction.

The operation of the device is as follows: The steam generator 12 generates a gaseous steam vapor at a predetermined pressure, for example, 100 atmospheres, and at a predetermined flow velocity. It will be understood that the values and magnitudes mentioned herein are exemplary only, and are used to serve as a basis for comparison with the pressures and velocities which exist downstream of the steam generator 12.

The steam is conveyed by pipe 14 at a predetermined flow rate and pressure depending on the operation of the valve 48 and delivered to the nozzle 16. The nozzle 16 and its diffusion cone section 18 are so dimensioned so as to decrease the pressure of the pressurized steam from its initial value of 100 atmospheres to a value near, and preferably slightly below, the ambient atmospheric pressure. The pressure at the downstream end of the diffusing section 18 is preferably 0.7 atmospheres absolute. This change in pressure is accompanied by a high change in the flow velocity of the steam; the velocity typically increasing from sonic speeds to several times the speed of sound. Thus, the carrier fluid passes through the mixing chamber 20, which is of constant cross-section, at a relatively high flow rate and low pressure.

At this time, the particulate material 38 is admitted to the chamber 20 via the operation of metering means 40, 42, 44, 46, and the high speed of the carrier fluid entrains and mixes the particulate material and conveys the resulting mixture downstream. The mixing process is begun in the mixing chamber due to the fast-moving stream of carrier steam and completed downstream in the constricting passage 52 and the delivery pipe 22.

The converging or constricting passage 52 receives the mixture of particulate material 38 and its carrier fluid and is operative to increase the pressure, and reduce the speed, of the mixture. The constricting passage 52 is dimensioned by known fluid flow principles so as to increase the pressure back to about 60–70 percent of the pressure which existed in the steam generator 12. Thus, the delivery pipe 22 receives a mixture re-pressurized to about 60–70 atmospheres and conveys it to the place of use, e.g. a combustion chamber or a gas generator. The cross-section of the delivery pipe 22 is selected, as noted above, so as to be greater than the narrowest cross-section of the nozzle 16. This feature assures that back-pressure will be prevented.

In one preferred application, coal dust is used as a combustible material to be delivered to a combustion or gasification chamber. A combustion-supporting medium, such as air or oxygen, is therefore needed and may be added to the carrier steam by means of the tank 24 and the pipe 26. In such a case, the air or oxygen is delivered to the pipe 14 at substantially the same pressure as the pressurized steam, i.e. 100 atmospheres.

If the alternative arrangement using pipe 28 and 30 are desired to be used, the air or oxygen need be supplied only at ambient pressure, or alternatively only at a pressure slightly above ambient pressure. Finally, if the arrangement using pipes 28 and 32 are desired to be used, then air or oxygen can be supplied at the prevailing pressure existing in the delivery pipe 22, i.e. on the order of 60–70 atmospheres.

It is evident from the above-given description that the mixture comprising individual elements of water vapor, air, oxygen, particulate material or any combination of these elements, is continuously coveyed under pressure to the place of consumption.

Figure 2:
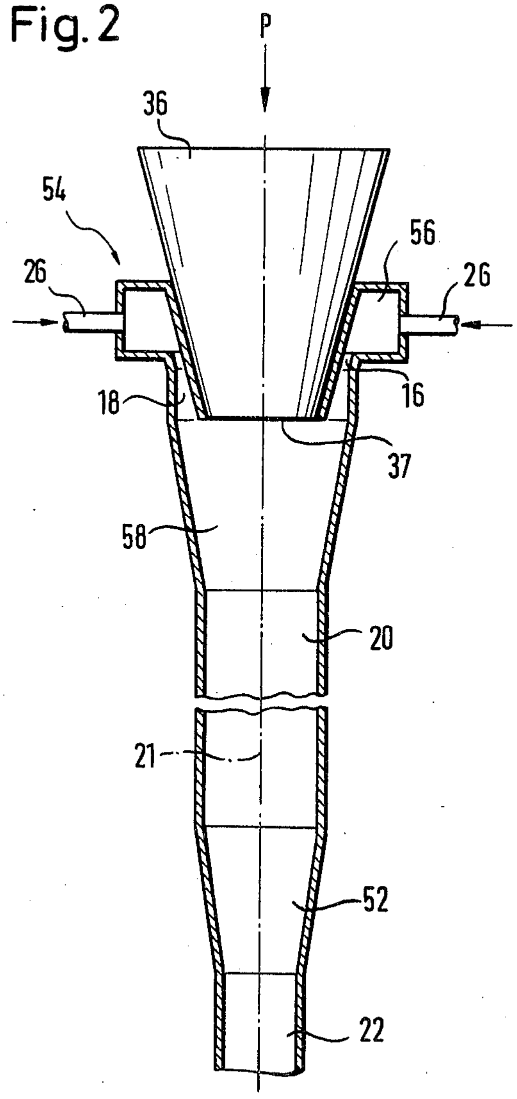
FIG. 2 is a diagrammatic, partially sectioned, view of a second embodiment of an apparatus according to the present invention.

Referring now to FIG. 2, it will be seen that like reference numerals identify like parts so that a detailed discussion of those elements common to FIG. 1 are not believed to be necessary. In this embodiment, the particulate material 38 is fed centrally, axially and parallel to the direction of the flow of the carrier fluid.

The apparatus comprises a hopper or container 36' which is filled from above by a feeder worm or the like (non-illustrated). The hopper 36' discharges the particulate material downwardly in the direction of the arrow P. Although not illustrated for the purpose of clarity, the hopper 36 is provided with metering means, of the type described with reference to FIG. 1.

In its lower region, the hopper 36' is surrounded by a device 54 which comprises an annular pressure chamber 56. A gaseous medium, e.g. air and/or oxygen, is supplied by means of pipes 26' into the chamber 56 at a predetermined pressure, velocity and temperature. For comparative purposes, the gas within the chamber 56 is at ambient temperature, sonic speeds, and has a pressure of 20 bar.

At the lower region of the chamber 56, the chamber walls form an annular slot which serves as the throat portion of an annular nozzle 16'. The nozzle has a converging section and a diffusing conical section 18'. The nozzle is dimensioned so that the speed of the carrier fluid passing therethrough is at sonic speeds. The annular diffusion cone section 18' expands the gas and increase its speed to supersonic levels. At the downstream end of the diffusing section 18', the static pressure is preferably slightly below atmospheric pressure, on the order of 0.7 atmospheres, i.e. 0.3 atmospheres below ambient pressure.

The mixture of carrier gas and particulate material is thereupon conducted to a mixing chamber 20', a constricting passage 52' and a delivery pipe 22', exactly as discussed in connection with FIG. 1. However, in this embodiment, an additional constricting passage 58 is located upstream of the mixing chamber 20'.

The embodiment of FIG. 2 operates as follows: A gaseous carrier fluid enters the pressure chamber 56 through pipe 26' and flows at sonic speed through the nozzle and exits the diffusing section at relatively higher supersonic speeds and at a pressure slightly less than ambient pressure. The annular diffusor 18' creates a high-velocity, generally hollow-cylindrical gas jet which extends into the constricting passage 58.

At the lower rim 37 of hopper 36', the particulate material is fed centrally into the hollow interior of the jet. The particulate material will be entrained and mixed by the outwardly-lying gas jet.

Taking a cross-section at the level of the rim 37 in a direction transversely of the flow path which extends in the direction of the axis 21, the flow stream comprises an outer hollow cylindrically-shaped column surrounding an inner hollow cylindrically shaped core of particulate material. The relatively faster outer stream will produce a great amount of turbulence and begin to disperse the particulate material throughout the outer stream. The mixing continues downstream through the additional constricting passage 58 and is completely in the mixing chamber 20', wherein the entire stream comprises a homogeneous mixture of particulate material and carrier fluid.

The function of the constricting passage 52' is to re-compress the mixture and bring the pressure back to a level desired for the particular application. For instance, the constricting passage 52' may be dimensioned to pressurize the mixture to a pressure which is 60–70 percent of the pressure which existed in the inlet pipes 26.

The positioning of the hopper 36' centrally and coaxially above the mixing chamber 20' and within the pressure chamber 56 results in a particularly compact feeding arrangement which results in an exceptionally well-distributed homogeneous mixture.

In both the embodiments of FIGS. 1 and 2, it will be seen that the particulate material is never subjected to pressure, that is, the dust never forms or agglomerates into lumps which would otherwise clog the apparatus and disturb the smooth and continuous running of the apparatus.

A particularly useful application is to convey coal dust to a combustion chamber, furnace or gasification chamber which produces gas. By mixing the coal dust with a carrier gas or vapor medium in the above-mentioned manner, the coal dust is never compressed. To improve the efficiency of the subsequent combustion, gas, such as air or oxygen, may be added to the carrier stream. In addition, it is also possible to have combustion or gasification occur in the mixing chamber itself.

Typical examples of particulate material include any finely-divided, granular or powdery solid material particles such as, but not limited to, coal dust, saw dust, wheat, sugar, etc.

It will be understood that each of the elements described above, or two or more together, may also find a useful application in other types of constructions and processes differing from the types described above.

While the invention has been illustrated and described as embodied in a process and apparatus for continuously conveying particulate material, it is not intended to be limited to the details shown, since various modifications and structural changes may be made without departing in any way from the spirit of the present invention.

Without further analysis, the foregoing will so fully reveal the gist of the present invention that others can, by applying current knowledge, readilt adapt it for various applications without omitting features that, from the standpoint of prior art, fairly constitute essential characteristics of the generic or specific aspects of this invention.

What is claimed as new and desired to be protected by Letters Patent is set forth in the appended claims;

1. A process for conveying particulate material, particularly for continuously transporting coal dust towards a combination chamber, comprising the steps of conveying a stream of carrier fluid at predetermined pressure and velocity along a path; reducing the pressure of the stream to a value less than the predetermined pressure by passing the stream through a converging section of a nozzle provided at one location of the path, and thereupon through a diverging section of the nozzle for generating a low-pressure, high-velocity zone at another location of the path; mounting a chamber in the path downstream of the diverging section; and admitting particulate material into the presence of the stream passing through the chamber by centrally admitting the particulate material in direction of the path through an outlet opening of a container located in the path, said admitting step including admitting the particulate material at said low-pressure zone free of agglomerations by locating the outlet opening at said other location of the path which is downstream of said one location thereof, and said admitting step also including forming an envelope about the particulate material in the chamber by surrounding said outlet opening with said diverging section so that the stream issuing therefrom towards said chamber entrains and uniformly mixes the particulate material.

2. A process as defined in claim 1, wherein said step of reducing the pressure of said carrier fluid includes increasing the speed of said carrier fluid until it obtains a speed faster than the speed of sound, and until the pressure of said carrier fluid is lowered to a pressure slightly below atmospheric pressure.

3. A process as defined in claim 2, wherein said step of reducing the pressure of said carrier fluid continues until a pressure on the order of 0.7 atmospheres absolute is obtained at said zone at said other location of the path.

4. A process as defined in claim 1, wherein said step of admitting the particulate material includes regulating the amount of said material being admitted into the presence of said carrier fluid.

5. A process as defined in claim 4, wherein said step of admitting said particulate material includes subjecting said particulate material to ambient atmospheric pressure, whereby said particulate material flows freely and evenly into the presence of said carrier fluid and is free of agglomeration.

6. A process as defined in claim 1; and further comprising the step of decelerating and compressing the mixture of carrier fluid and particulate material subsequent to admitting the particulate material into the presence of said carrier fluid.

7. A process as defined in claim 6, wherein said step of conveying the carrier fluid includes conveying steam and a gas containing air and oxygen, and wherein said step of admitting said carrier fluid includes admitting said gas to a portion of the path downstream of said nozzle 8. A process as defined in claim 7, wherein said step of admitting said gas includes admitting said gas downstream of the path portion where said mixture is decelerated and compressed.

9. A process as defined in claim 1, wherein said step of conveying the carrier fluid includes conveying steam and a gas containing air and oxygen, and wherein said step of admitting said carrier fluid includes admitting said gas to a portion of the path upstream of said nozzle.

10. A process as defined in claim 9, wherein said step of admitting said gas includes admitting said gas into said chamber.

11. A conveyor for particulate material, particularly for continuously transporting coal dust particles towards a combustion chamber, comprising means for conveying a stream of carrier fluid at predetermined pressure along a path; means in the path for reducing the predetermined pressure of the stream, said reducing means including a nozzle having an upstream converging section provided with a discharge gap at which it communicates with the path, and a downstream diverging section for diffusing the stream and generating a low pressure zone at a downstream portion of the path; a chamber downstream of and in communication with said diverging section; and means for admitting particulate material into the presence of the stream passing through said chamber, said admitting means including a container having an outlet opening for centrally admitting particulate material into said chamber in direction of the path, said outlet opening being located in said downstream portion of the path and downstream of said gap so as to admit the particulate material at said low pressure zone free of agglomerations, and said outlet opening being surrounded by said diverging section so that the stream issuing therefrom towards said chamber forms an envelope about the particulate material therein to thereby entrain and uniformly mix the particulate material.

12. An apparatus as defined in claim 11; and further comprising metering means for regulating the rate and amount of the particulate material being admitted into the presence of said carrier fluid.

13. An apparatus as defined in claim 12, wherein said container has an axis that is centrally aligned in direction of the path, said outlet opening being positioned upstream of said chamber for axially feeding the particulate material into the center of the axial cross-section of the path.

14. An apparatus as defined in claim 12, wherein said container is funnel-shaped and is positioned above said chamber; and wherein said metering means comprises a slidable control member having an opening adapted to be registered, at least in part, with said outlet opening of said container.

15. An apparatus as defined in claim 14, wherein said opening of said container is annular 16. An apparatus as defined in claim 11, wherein said chamber has a main mixing portion of substantially constant cross-sectional configuration.

17. An apparatus as defined in claim 1, wherein said chamber further includes a pre-mixing constricting passage portion located intermediate said nozzle and said main mixing portion.

18. An apparatus as defined in claim 16; and further comprising a constricting passage downstream of said chamber for compressing the mixture, and a delivery pipe having a cross-sectional diameter less than the diameter of said chamber.

19. An apparatus as defined in claim 11, wherein said conveying means comprises an annular pressure chamber surrounding said container and further comprising at least one inlet pipe means for admitting said pressurized carrier fluid.

20. An apparatus as defined in claim 19, wherein said annular pressure chamber has wall portions bounding an interior which communicates with said nozzle.

* * * * *